United States Patent
Shinohara

(10) Patent No.: US 7,814,809 B2
(45) Date of Patent: Oct. 19, 2010

(54) PLASTIC GEAR

(75) Inventor: Ryutaro Shinohara, Hamamatsu (JP)

(73) Assignee: Suzuki Motor Corporation, Shizuoka-Ken (JP)

( * ) Notice: Subject to any disclaimer, the term of this patent is extended or adjusted under 35 U.S.C. 154(b) by 0 days.

(21) Appl. No.: 11/959,029

(22) Filed: Dec. 18, 2007

(65) Prior Publication Data

US 2008/0146402 A1    Jun. 19, 2008

(30) Foreign Application Priority Data

Dec. 19, 2006    (JP)    .............................. 2006-340841

(51) Int. Cl.
    *F16H 55/14*    (2006.01)
(52) U.S. Cl. ............................. 74/443; 74/409; 74/411; 74/440; 74/461
(58) Field of Classification Search .................. 74/439, 74/443, 446–449, DIG. 10, 461, 409, 411, 74/440
    See application file for complete search history.

(56) References Cited

U.S. PATENT DOCUMENTS

| | | | | |
|---|---|---|---|---|
| 2,720,119 A | * | 10/1955 | Sherman ........................ | 74/460 |
| 2,839,943 A | * | 6/1958 | Hausmann et al. ............ | 74/445 |
| 3,180,171 A | * | 4/1965 | Arpin ........................... | 74/460 |
| 3,199,364 A | * | 8/1965 | Dew .............................. | 74/460 |
| 3,200,665 A | * | 8/1965 | Wells ........................... | 74/446 |
| 3,272,027 A | * | 9/1966 | Wayman ...................... | 474/112 |
| 3,530,735 A | * | 9/1970 | Allen ........................... | 74/446 |
| 3,534,625 A | * | 10/1970 | Haviland ...................... | 74/411 |
| 3,999,445 A | * | 12/1976 | Liautaud ........................ | 74/445 |
| 4,589,860 A | * | 5/1986 | Brandenstein et al. ...... | 474/161 |
| 5,074,828 A | * | 12/1991 | Ellis ............................. | 474/161 |
| 5,098,346 A | * | 3/1992 | Redmond ..................... | 474/161 |
| 5,452,622 A | * | 9/1995 | Fenelon ........................ | 74/411 |
| 5,852,951 A | * | 12/1998 | Santi ............................ | 74/443 |
| 5,927,149 A | * | 7/1999 | Moody ......................... | 74/443 |
| 6,591,708 B2 | * | 7/2003 | Kobayashi et al. ............ | 74/446 |
| 6,875,113 B2 | * | 4/2005 | Nichols ........................ | 464/90 |
| 6,988,582 B2 | * | 1/2006 | Kitami et al. ................. | 180/444 |
| 2002/0043124 A1 | * | 4/2002 | Shiga et al. ................... | 74/434 |
| 2007/0089555 A1 | * | 4/2007 | Tomoda et al. ................ | 74/443 |

FOREIGN PATENT DOCUMENTS

DE    619445 A1 *    10/1994

(Continued)

*Primary Examiner*—Richard W Ridley
*Assistant Examiner*—Matthew A Johnson
(74) *Attorney, Agent, or Firm*—Alston & Bird LLP

(57) ABSTRACT

A plastic gear having a gear peripheral portion including a tooth portion is constituted by a plastic material, and a gear inner circumferential member with an annular shape or a disk shape is provided at the inner circumferential side of the gear peripheral portion. The gear peripheral portion includes an inner core and a surface layer member, the inner core being covered with the surface layer member and made of plastic with high elastic modulus and high strength, and the surface layer member being made of plastic with relatively low elastic modulus. The inner core is revolvably fitted around the gear inner circumferential member so as to revolve around the gear revolving axis, and an engaging portion is provided at an interface of the surface layer member and the gear inner circumferential member for preventing relative revolution around the gear revolving axis.

8 Claims, 5 Drawing Sheets

FOREIGN PATENT DOCUMENTS

| | | |
|---|---|---|
| JP | 55-041273 A | 3/1980 |
| JP | 02-008542 A | 1/1990 |
| JP | 08-156124 A | 6/1996 |
| JP | 08-174689 A | 7/1996 |
| JP | 2000-145928 A | 5/2000 |
| JP | 2001-208166 A | 8/2001 |
| JP | 2002-156025 A | 5/2002 |
| JP | 2004-150518 A | 5/2004 |
| JP | 2005-214338 A | 8/2005 |

* cited by examiner

PLASTIC GEAR

CROSS REFERENCE TO RELATED APPLICATIONS

This application claims the benefit of Japanese Patent Application No. 2006-340841, filed Dec. 19, 2006, which is incorporated herein by reference in its entirety and for all purposes.

FIELD OF THE INVENTION

The present invention relates to a plastic gear including an insert made of metal or the like and a plastic portion.

BACKGROUND OF THE INVENTION

In some cases, a steel gear has problems in which engaging noise caused by transmission error or tooth beating sound caused by backlash results in vibrations and noise. Compared with this, a plastic gear in which a portion of the gear tooth is formed from plastic, has a merit of possessing physical properties of viscoelastic behavior of the plastic, that is, large attenuation and low rigidity, and therefore, it is possible to complete the gear with low vibrations and low noise. Further, since the plastic gear is lightweight, and has the advantage that the plastic gear is obtained at low cost since gear-cutting work is not necessary because the tooth portion can be formed just by injection molding; and thus replacement from the steel gear advances, so that the plastic gears are broadly used in OA equipment, or audio products. However, the above physical properties providing low vibrations and low noise become constraint, so that, in almost cases, the plastic gears are used in light load, low revolution and at ambient temperature.

As a next application of the plastic gear from the contemporary condition, if it is possible to realize application to a driven gear within engine such as, for instance, the balancer weight drive gear or the camshaft timing gear, of the four-wheel car or the two-wheel vehicle, it is extremely effective for noise reduction. However, suppose that the plastic gear be applied to the driven gear within engine, the plastic gear is naturally used under the conditions of high load, high revolution and high temperature, and it should be considered that impact load is added to the plastic gear or the plastic gear comes into contact with engine oil and the like, and further, since the plastic gear be used with combination of the steel gear, it is necessary for the plastic gear to have high fatigue strength, high abrasion resistance, high heat resistance and high impact resistance compared with conventional use, in addition, properties of high oil resistance, high gasoline resistance, and low aggression to the opposing steel gear are required.

As a method to improve mechanical strength of the plastic gear, for instance, JP8-156124A and JP8-174689A have proposed the plastic gear in which fabric cloth of cylindrical aramid fiber is arranged periphery of the metal insert, a plastic portion is formed in such a way as to impregnate thermosetting resin material of phenol resin or the like to the fabric cloth, and after fabricating disk shape plastic molding (gear blank), gear-cutting work is performed to the plastic portion to form gear shape. However, it is necessary for the plastic gear to be performed gear-cutting work of the plastic portion, after forming the gear blank, and thus there is the problem of becoming high cost caused by increase of number of man-hour. Further, there is also the problem that, as the property of the thermosetting resin material, the impact resistance is low, and cycle time at the time of manufacturing becomes long due to heat treatment.

On the other hand, performed is the attempt of forming the gear tooth by only injection molding without going through configuration of the gear blank, and fabricating the gear without performing the gear-cutting work. For instance, JP55-41273A has disclosed the plastic gear using the thermoplastic resin material, and further, JP2-8542A and JP2005-214338A have disclosed the plastic gear in which the plastic portion is made two-layer structure of the obverse layer tooth and the internal layer tooth, and the thermoplastic resin material of including minute quantity of reinforced fiber or not including reinforced fiber is used in the obverse layer tooth, while the thermoplastic resin material of highly including the reinforced fiber such as glass fiber is used in the internal layer tooth. Although these plastic gears intend improvement of the fatigue strength and the abrasion resistance, and reduction of the aggression to the opposing steel gear, sufficient improvement with respect to the impact resistance is not achieved.

To this problem, for instance, JP2000-145928A and JP2004-150518A have proposed the method for adding elastomer to the gear main body portion. However, the methods disclosed therein have the problem in which cost becomes high caused by increase of the number of parts and man-hour of fabrication. In addition, JP2001-208166A and JP2002-156025A have disclosed the joined structure of the plastic portion forming the gear tooth and the metal insert; however, both cases are structures in which entirety of the plastic portion is fixed to the metal insert, and thus improvement of the impact resistance is not considered.

BRIEF SUMMARY OF THE INVENTION

The present invention has been achieved in consideration of such actual condition, and its object is to provide a plastic gear having inherent properties such as low vibration and low noise, as well as properties of high fatigue strength, high abrasion resistance, high heat resistance, high impact resistance and low aggression to the opposing gear, so that the plastic gear is capable of being used in high load applications such as the drive gear in the engine of four-wheeled and two-wheeled vehicles.

In order to solve the above described problem, the present invention is a plastic gear wherein the gear peripheral portion including a tooth portion is constituted from plastic, and an annular shaped or a disk shaped gear inner circumferential member is provided at an inner circumferential side of the gear peripheral portion, in which the gear peripheral portion including the tooth portion is constituted from an inner core made of plastic having high elastic modulus and high strength, and a surface layer member made of plastic having relatively-low elastic modulus covering the inner core; the inner core is revolvably fitted around the gear inner circumferential member so as to be able to revolve around the gear revolving axis, and at a joined portion of the surface layer member and the gear inner circumferential member, an engaging portion for preventing relative revolution around the gear revolving axis is provided.

In the second aspect of the present invention, the gear inner circumferential member has a large diameter portion at a center in the direction of a gear revolving axis and small diameter portions at both sides thereof, in which the inner core is fitted around the large diameter portion, both lateral layer portions of the surface layer member are overlapped with both lateral faces of the large diameter portion covering a fitted portion of the inner core and the large diameter portion, and are joined with the small diameter portion; the engaging portion is provided at the joined portion.

In addition, in the third aspect of the present invention, a fitted portion of the inner core and the gear inner circumferential member is constituted from at least one pair of a circumferential groove and a circumferential ridge, extending in a circumferential direction of them.

Further, in the fourth aspect of the present invention, the gear inner circumferential member forms a concave extending in a circumferential direction at a portion along the small diameter portion of both lateral faces of the large diameter portion; and the joined portion of the surface layer member is widened to a center side in a direction of a gear revolving axis.

In addition, in the preferred aspect of the present invention, the gear inner circumferential member is constituted from metals or ceramic materials, in which the inner core is formed by an insert injection molding with the gear inner circumferential member as an insert material at periphery of it, and the surface layer member is formed by insert injection molding using the gear inner circumferential member and the inner core as insert materials at periphery of them.

Since it is constituted as described above, the plastic gear according to the present invention absorbs vibrations or impacts caused by torque fluctuation and reduces tooth beating sound by backlash as a result of the surface layer member being made of a plastic material of relatively-low elastic modulus. Simultaneously, because the inner core is made of a plastic material of high elastic modulus/high strength, improvement of strength of the base of the tooth can be achieved.

In particular, when a load is placed on the gear tooth portion by engagement, relative displacement between the surface layer member and the gear inner circumferential member is not generated; however, since the inner core is not constrained in the revolving direction, relative displacement between the inner core and the gear inner circumferential member is possible. In accordance with this, the load on the engaged tooth portion is transmitted to all the other tooth portions not engaged by the inner core of high elastic modulus/high strength, and is dispersed to all over the obverse layer portion made of plastic of relatively-low elastic modulus. Due to the viscoelastic behavior between a peripheral side (tooth portion) of the surface layer member and an inner circumferential side (joined portion to the gear inner circumferential member, engaging portion), vibrations are attenuated and impacts are absorbed. Thus, low vibrations/low noise, high fatigue strength, high impact resistance and high abrasion resistance can be realized.

In addition, the property as described above is completed by structures of the surface layer member, the inner core and the gear inner circumferential member without depending on the physical property of the material itself; and thereby it is not necessary for the plastic gear to include reinforced materials such as reinforced fibers in the surface layer member, so that low aggression to an opposing gear is maintained. Since the degree of freedom of material selection is high, a variety of applications as a plastic gear are anticipated.

In the plastic gear according to the second aspect of the present invention, both lateral layer portions of the surface layer member are arranged over a wide range in a radial direction at lateral face of the gear inner circumferential member, elastic deformation amount of the surface layer member is secured largely, and thus absorption of larger vibrations/impacts becomes possible.

Further, in the plastic gear according to the third aspect of the present invention, since the fitted portion of the inner core and the gear inner circumferential member is constituted by at lest one pair of a circumferential groove and a circumferential ridge extending in circumferential direction thereof, it is possible to prevent deformation in the axial direction of the surface layer member or inclination of a gear revolution surface caused by the parts of high rigidity without disturbing relative displacement between the gear inner circumferential member and the inner core around the gear revolving axis.

In addition, in the plastic gear according to the fourth aspect of the present invention, since the width (thickness) of the joined portion of the surface layer member and the gear inner circumferential member capable of being secured largely without increasing the width of the gear; in the limited installation space of the gear, strength of the engaging portion is caused to increase, and the surface layer member is further solidly integrated with the gear inner circumferential member, and thus certain absorption of vibrations/impacts becomes possible.

In the plastic gear according to the present invention, the gear inner circumferential member is constituted from metals or ceramic materials. Since the inner core is formed by insert injection molding with the gear inner circumferential member as the insert material at a periphery thereof, and the surface layer member is formed by insert injection molding with the gear inner circumferential member and the inner core as the insert materials at a periphery thereof, the plastic portion is formed using engineering plastics such as nylon. Further, since the tooth portion can be formed simply by injection molding, so that it is not necessary to perform a gear-cutting work, and the formed plastic gear which is provided with properties such as high fatigue strength, high abrasion resistance, high heat resistance, high impact resistance and low aggression to opposing gears in addition to its inherent properties such as low vibrations and low noise, can be realized with high quality at a low cost.

DETAILED DESCRIPTION OF THE INVENTION

The present invention now will be described more fully hereinafter. However, this invention may be embodied in many different forms and should not be construed as limited to the embodiments set forth herein; rather, these embodiments are provided so that this disclosure will satisfy applicable legal requirements. Like numbers refer to like elements throughout. As used in this specification and the claims, the singular forms "a," "an," and "the" include plural referents unless the context clearly dictates otherwise.

Hereinafter, an embodiment of the present invention is described in detail with reference to the drawings.

Figure 1:
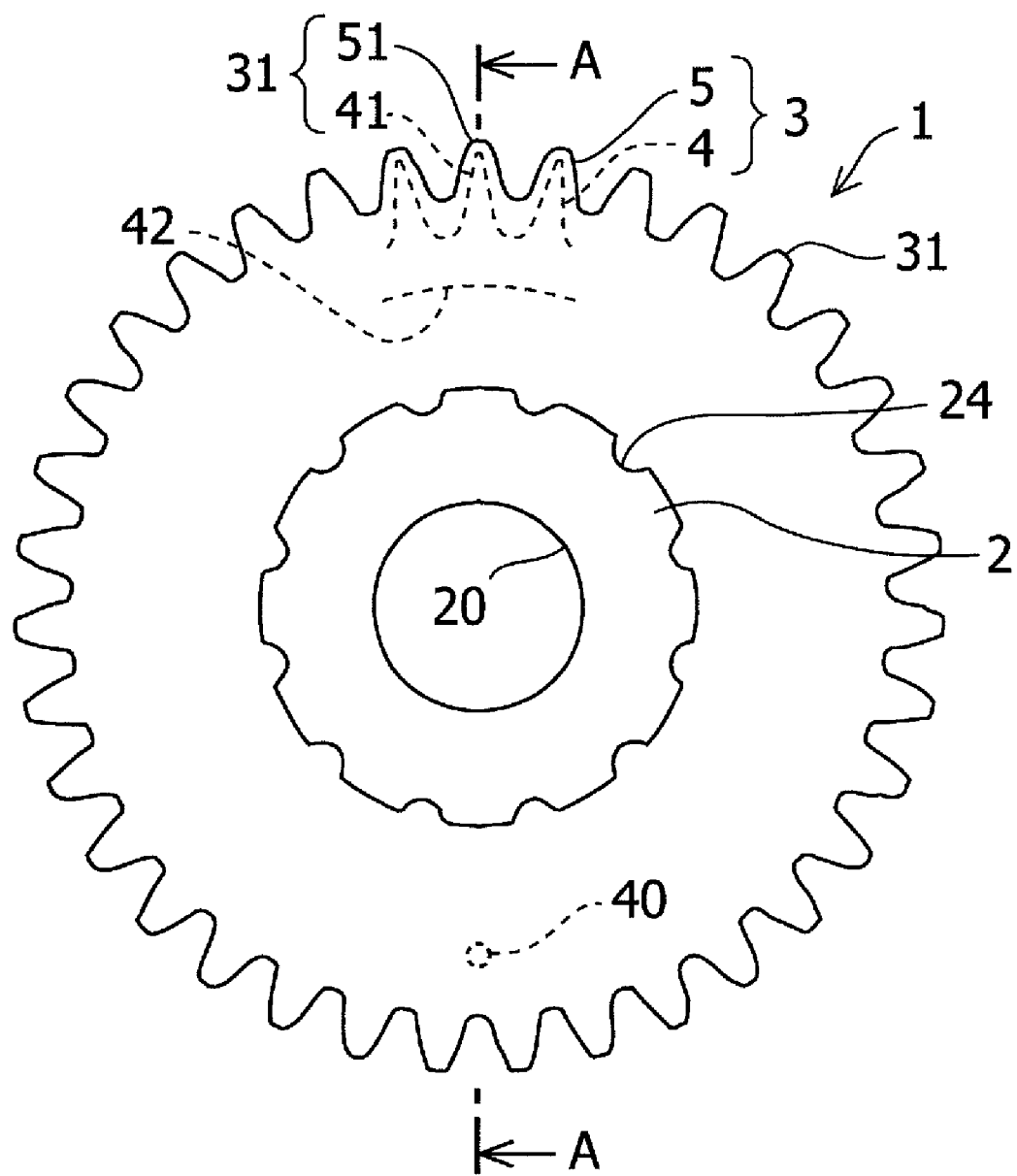
FIG. 1 is a side view showing a plastic gear according to an embodiment of the present invention.
Figure 2:
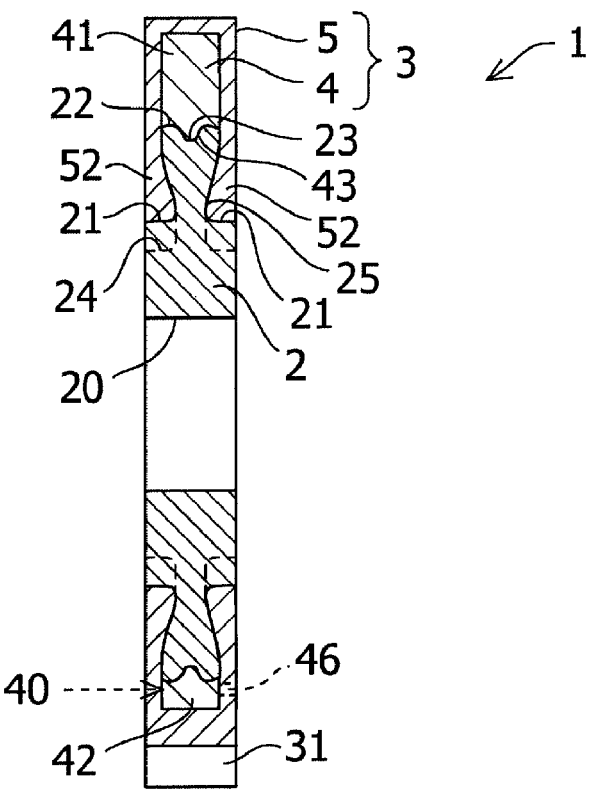
FIG. 2 is a cross sectional view along A-A of FIG. 1.
Figure 3:
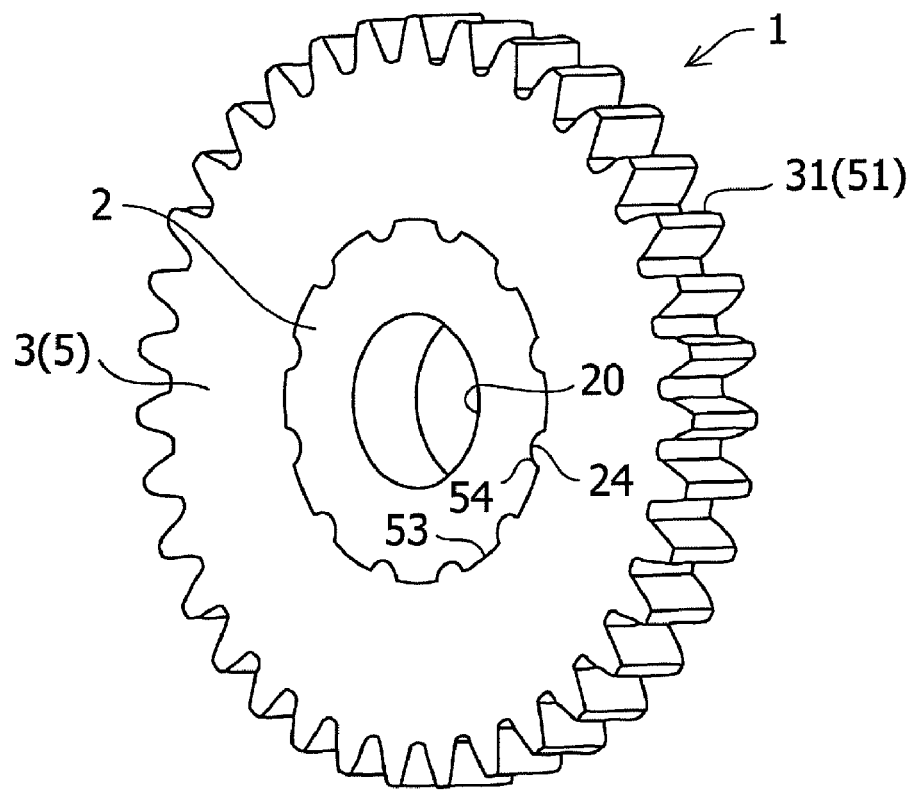
FIG. 3 is a perspective view showing the plastic gear according an embodiment of the present invention.

FIG. 1 is a side view showing a plastic gear 1 of the embodiment in which the present invention is implemented as a spur gear, FIG. 2 is its A-A cross sectional view, and FIG. 3 is a perspective view. In the drawings, the plastic gear 1 is constituted from a metal insert 2 (gear inner circumferential member) and a plastic portion 3 including tooth portion 31 of its peripheral side. The plastic portion 3 is constituted from an inner core 4 made of plastic material of high elastic modulus and high strength, and a surface layer member 5 made of plastic material of low elastic modulus covering the inner core 4.

Figure 4:
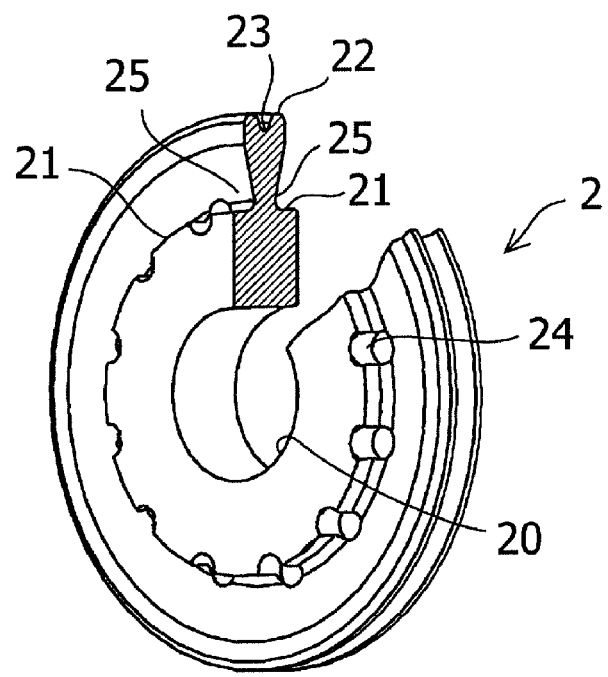
FIG. 4 is a partially cut off perspective view showing a metal insert.

The metal insert 2 has, as shown in FIGS. 2 and 4, a disk shape or annular shape in which a shaft hole 20 is penetrated at a center, and its peripheral portion is constituted from a large diameter portion 22 at the center in the axial direction and small diameter portions 21, 21 at its both sides. The peripheral surface of the large diameter portion 22 is a portion into which the inner core 4 is fitted, and the circumferential groove 23 extended over whole periphery with even cross sectional shape is formed. On the other hand, peripheral surfaces of the small diameter portions 21, 21 are portions to which the surface layer member 5 is joined, and locking grooves 24 (engaging portion) with predetermined pitch are formed respectively in the peripheral direction. In the example illustrated, the locking grooves 24 are formed as half-circular groove, and provided at twelve portions at one side with the same pitch in the peripheral direction.

In addition, circumferential concaves 25, 25 are formed extending in the circumferential direction at portions along the small diameter portions 21, 21 at both lateral faces of the large diameter portion 22 respectively, thereby thickness is reduced compared with a peripheral portion thereof, and circumferential surfaces of respective small diameter portions 21, 21 are widened accordingly toward center in a gear revolving axis direction. Meanwhile, the deepest portion of the locking groove 24 forms a shallow circular pit which is further recessed to the circumferential concave 25. That is, the locking groove 24 is formed from a peripheral surface of the small diameter portion 21 to a lateral face of the large diameter portion 22.

Figure 5:
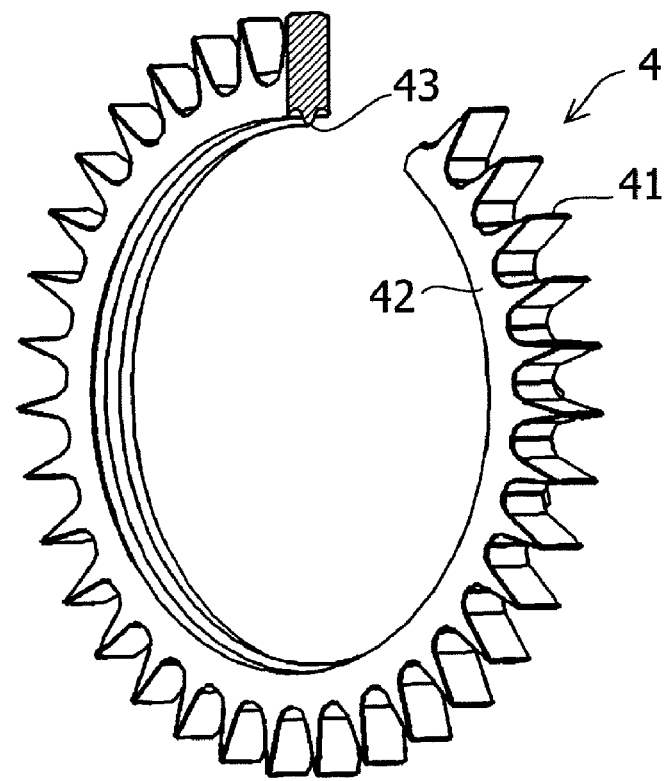
FIG. 5 is a partially cut off perspective view showing an inner core.

The inner core 4, as shown in FIGS. 2 and 5, is constituted from an inner tooth portion 41 corresponding to respective tooth portions 31 of the plastic gear 1, and an annular portion 42 joining respective inner tooth portions 41 in the peripheral direction. On an inner circumferential surface of the annular portion 42, a circumferential ridge 43 engaging the circumferential groove 23 of the large diameter portion 22 of the metal insert is formed. In accordance with this, the relative revolution of the inner core 4 is only allowed in the circumferential direction to the metal insert 2 under the condition that the inner core 4 is fitted around the large diameter portion 22 of the metal insert 2.

Figure 6:
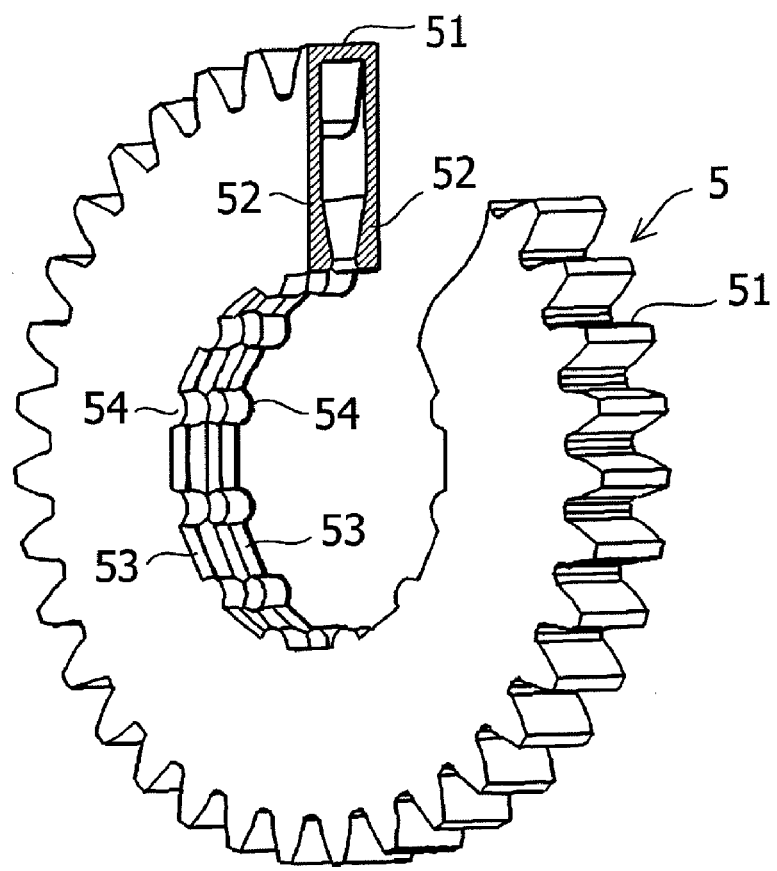
FIG. 6 is a partially cut off perspective view showing a surface layer member.

The surface layer member 5, as shown in FIGS. 2 and 6, corresponds to respective tooth portions 31 of the plastic gear 1, and is constituted from an obverse tooth portion 51 for coating respective inner tooth portions 41 of the inner core 4, and both lateral layer portions 52, 52 for coating a part from a lateral face of the respective inner tooth portions 41 to a lateral face of the large diameter portion 22 of the metal insert; and the both lateral layer portions 52, 52 are joined integrally by the obverse tooth portion 51. Inner circumferential edges 53, 53 of the both lateral layer portions 52, 52 are joined with the metal insert small diameter portions 21, 21, in which locking projections 54, 54 (engaging portion) for engaging respective locking grooves 24 are formed at edge portion corresponding to the respective locking grooves 24 of the metal insert small diameter portions 21, 21. In addition, corresponding to the concaves 25, 25 along the metal insert small diameter portions 21, 21, the inner circumferential edges 53, 53 of the both lateral layer portions 52, 52 have large thickness compared with other portions, accordingly the respective locking projections 54, 54 have large thickness, so that strength as the engaging portion is secured.

When manufacturing the plastic gear 1 constituted as above, firstly, injection molding is performed under the condition that the metal insert 2 is inserted into the mold for molding the inner core 4, and a composite body of the metal insert 2 and the inner core 4 is formed. Subsequently, injection molding is performed under the condition that the composite body (2, 4) is inserted into the mold for molding the surface layer member 5, so that the surface layer member 5 covering outer circumferential portion of the inner core 4 and the metal insert 2 is formed.

Although the metal material used for the metal insert 2 is not particularly limited, for instance, iron, aluminum, copper and alloy thereof are preferable. Further, a sintered material having the same rigidity as a metal can be used. In addition, as the plastic material used for the plastic portion 3, although the thermoplastic resin material such as PA (polyamide), PPS (polyphenylene sulfide), PES (polyether sulfone), POM (polyacetal), which are so-called engineering plastic, are appropriate. As mentioned above, it is preferable that, for the inner core 4, a plastic material with high elastic modulus and high strength is used, while, for the surface layer member 5, a plastic material with relatively low elastic modulus is used.

In nylon-based plastic materials which are used as engine parts, as the inner core 4, a plastic material which has enhanced rigidity by including a reinforcing fiber, such as glass fiber, carbon fiber or the like, in PA6, PA66, PA46, PA6T, PA6.6T, PA9T, and which has a small molding shrinkage, is preferable. In addition, an inorganic material may be used the reinforcing material, and a crosslinkable component obtained by electron beam irradiation may be included as a special compound. For instance, a thermoplastic resin material containing, based on a PAT6T equivalent resin, 40 wt % of carbon fiber as the reinforcing fiber, wherein rigidity and strength are high, and the molding shrinkage is $1/1000$ or less, is preferable.

On the other hand, it is preferable for the surface layer member 5 to be PA6, PA66, PA46, PA6T, PA6.6T, PA9T and the like, and to be a natural material into which the reinforcing material is not mixed. In this case, a minute quantity of reinforced material such as aramide fiber, carbon fiber or the like free from aggression to an opposing steel gear may be included. In addition, as the special compound, a component crosslinked by electron beam irradiation may be included. Further, the elastomer can be used in accordance with application of the plastic gear 1.

At the time of injection molding of the inner core 4, under the condition of inserting the metal insert 2 into the mold, as shown in FIG. 2 or FIG. 1, a resin is poured into the mold cavity through one point of a pin gate 40 provided on the lateral face of the annular portion 42. In the illustrated example, since the number of teeth is an odd number, by setting the pin gate 40 to the annular portion 42 corresponding to the tooth bottom, resin flow is caused to flow together at one portion of the center of the inner tooth portion 41 (inner tooth portion 41 at upper side center of FIG. 1) facing the pin gate 40 while sandwiching a center portion in the radius direction therebetween. Accordingly, compared with the case of setting a plurality of gates, it becomes possible to control position of weld line within the inner tooth portion 41 more surely, and preventing strength decrease of the inner tooth portion 41 and the annular portion 42 caused by the weld line. Thus it becomes possible to manufacture the inner core 4 stably and good yield rate.

In addition, by using a thermoplastic resin material with small molding shrinkage for the inner core 4, the frictional force generated between the inner core 4 and the metal insert 2 at the time of displacement for the inner core 4 in the revolving direction becomes small, and thus displacement in the revolving direction for the inner core 4 becomes easy. Further, since the inner tooth portion 41 has a sharp tapered cross sectional triangular shape headed to tooth tip from tooth bottom, and the plastic poured into the mold flows into the respective inner tooth portions 41 from the annular portion 42, in a skin layer of the respective inner tooth portion 41, the reinforcing fibers are oriented in the direction headed to the tooth tip from the tooth bottom, and thus, there is an advantage that rigidity and strength of the inner tooth portion 41 are improved.

At the time of injection molding of the surface layer member 5, it is preferable that occurrence of the weld line giving an adverse effect to strength of the surface layer member 5 is suppressed in such a way that a disk gate (not shown) along one of the inner circumferential edge 53 of the surface layer member 5 is set, and the resin is poured into the mold cavity through the disk gate under the condition of inserting the composite body of the metal insert 2 and the inner core 4 into the mold.

Meanwhile, on the lateral face to become an opposite side to the disk gate of the annular portion 42 of the inner core 4, as shown in FIG. 2, by forming a support 46, deformation or displacement of the inner core 4 caused by resin flow pressure at the time of the injection molding of the surface layer member 5 may also be prevented. The support 46 may preferably be formed with the same pitch in the circumferential direction; however, it is not necessary to provide the support 46 corresponding to the whole inner tooth portions 41. In addition, the tip of the support 46 is caused to penetrate the surface layer member 5, so that the support 46 may also be engaged with a hole (not shown) provided on the mold of the surface layer member 5.

Next, in order to evaluate the plastic gear 1 according to the present invention, as a comparative example, formed is a plastic gear in which an locking groove having the same shape as the locking groove 24 is processed at the large diameter portion 22 of the metal insert 2 to prevent relative revolution between the metal insert 2 and the inner core 4. Thereafter, an experiment to compare strength is performed.

The respective plastic gears used for the experiment are the spur gears of: a module is 2.5 mm, a pressure angle is 20 degrees, the number of teeth is 35, a standard circle diameter is 87.5 mm, an addendum circle diameter is 92.9 mm, a tooth width is 11 mm, and a transmission coefficient is 0.145, in which, with respect to the inner core 4, the 40 wt % carbon fiber is included as the reinforcing material, the resin equivalent to PA6T of: a specific gravity is 1.70, a bending elastic modulus is 29 GPa, a melting point is 285° C., a glass transition temperature is 135° C., and a molding shrinkage is $^{1}/_{1000}$ or less, is used. With respect to the surface layer member 5, which is free from reinforcing material, a resin of PA46, having a specific gravity of 1.18, a bending elastic modulus of 2.9 GPa, a melting point of 295° C., a glass transition temperature of 78° C., and molding shrinkage of $^{15}/_{1000}$, is used.

Figure 7:
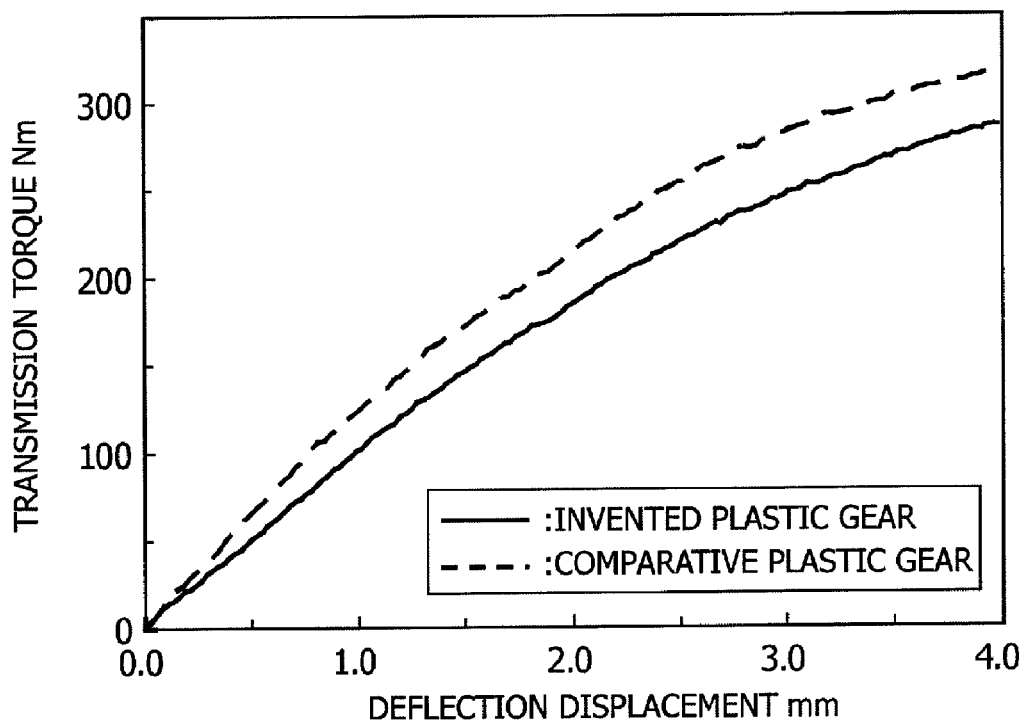
FIG. 7 is a graph showing transmission torque-deflection curve of the plastic gear according to the example and comparative example of the present invention.

FIG. 7 shows the static strength test results of the respective plastic gears. The test is performed in such a way that the respective plastic gears are engaged with the steel gears with the same specification of the plastic gears, and transmitting load increases gradually. A graph indicates transmission torque-deflection curve associated with the respective plastic gears in which a horizontal axis indicates deflection displacements (mm) in the gear tooth portion, and a vertical axis indicates transmission torque (Nm) of the gear tooth. From this graph, in the case where the transmission torque is equal, it is found that the deflection displacement of the plastic gear of the present invention is larger than that of the comparative example. In the plastic gear of the present invention, the inner core 4 is not constrained in the revolving direction. To the contrary, in the plastic gear of the comparative example, the inner core 4 is fixed in the revolving direction, and accordingly, it is understood that the deflection displacement in the gear tooth portion becomes large because the inner core 4 of the plastic gear of the present invention is displaced in the revolving direction based on the transmission torque.

When putting the above in order, firstly, with respect to the fatigue strength and the impact resistance, the inner core 4 includes the reinforcing fiber, and the fatigue strength and the impact resistance are reinforced by orientation of the reinforcing fiber caused by the above described shape of the inner tooth portion 41 and the molding process, so that the rigidity and the strength are secured. In addition, because the molding shrinkage of the plastic material is small, being $^{1}/_{1000}$ or less, the friction force generated between the inner core 4 and the metal insert 2 becomes small, and thereby, relative displacement toward the revolving direction to the metal insert 2 of the inner core 4 is performed effectively, so that the load acting on the obverse tooth portion 51 of the gear tooth portion 31 engaged therewith is transmitted to other respective inner tooth portions 41 not engaged through the annular portion 42 from the inner tooth portion 41 corresponding to the obverse tooth portion 51 of the gear tooth portion 31 engaged therewith. Thus, the load is dispersed over the whole of the plastic portion 3 including the obverse tooth portion 51 corresponding to the respective ones. In the conventional plastic gear, since the whole plastic portion is fixed to the metal insert, the stress is generated intensively to a root of a tooth of the gear tooth; however, the plastic gear of the present invention, due to dispersion of the load described above, the impact is absorbed and the stress is alleviated, so that it is possible to realize simultaneously high fatigue strength and high impact resistance.

Next, with respect to the vibration/noise property, the abrasion resistance and the opposing steel gear aggression, the plastic gear of the present invention has the surface layer member 5 formed with flexible PA46 resin, so that the gear tooth portion 31 becomes "large attenuation" and "low rigidity", resulting in low vibration/low noise. In addition, since a contact area at the time of engagement of the gear tooth portion 31 becomes large, contact pressure lowers, so that high abrasion resistance is obtained. Since the natural material free from reinforcing fiber is used, the property in which the opposing steel gear aggression is low is provided. Further, since the deflection quantity of the gear tooth portion 31 being subjected to the load caused by the engagement becomes larger compared with the conventional plastic gear, the plastic gear has excellent low vibration/low noise and high abrasion resistance. In addition, with respect to the heat resistance and the manufacturing cost, since a nylon-based resin is used for the plastic portion 3 (4, 5), the gear tooth portion 31 (41, 51) can be formed just by injection molding and gear-cutting work is not necessitated, which makes it possible to realize high heat resistance and low cost.

Figure 8:
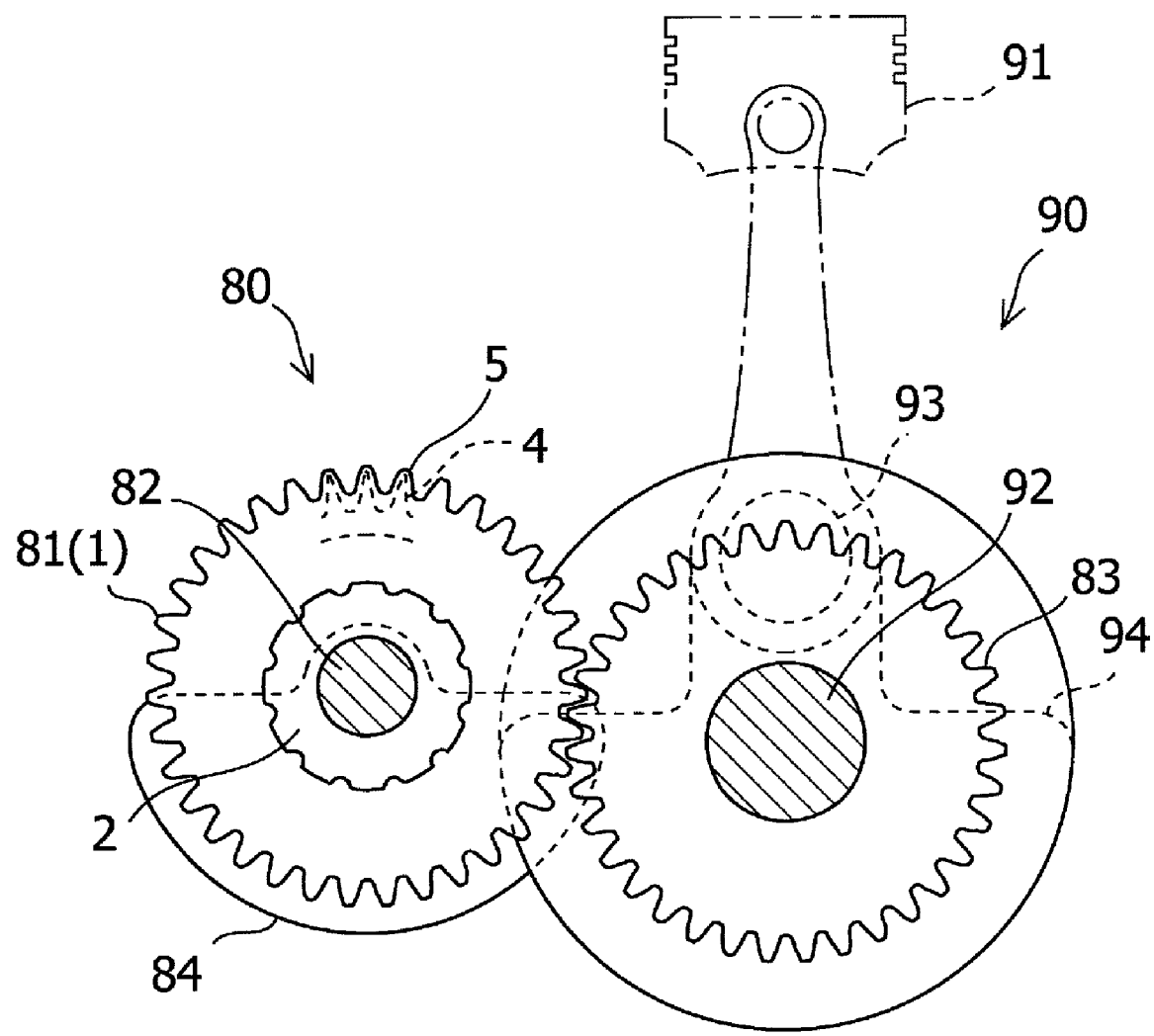
FIG. 8 is a schematic side view showing the embodiment in which the plastic gear according to the present invention is implemented in a balancer device of a combustion engine.

FIG. 8 shows an embodiment in which the plastic gear associated according to the present invention is embodied as a balancer driven gear 81 in a balancer device 80 of a single cylinder two-cycle engine 90. The balancer driven gear 81 has the same structure as the plastic gear 1 described above, and the same numerals have been given to the same members. In the drawing, the balancer device 80 is provided with a balancer shaft 82 arranged in parallel to a crankshaft 92 at one side of an engine 90, and the balancer driven gear 81 and a balance weight 84 are provided for the balancer shaft 82, on the other hand, a balancer drive gear 83 engaged with the balancer driven gear 81 is provided on the crank shaft 92.

At the opposite side of a crank pin 93 of the crank shaft 92, a balance weight 94 integrated with the crank shaft 92 is provided, in which a primary vibration in a cylinder shaft direction accompanied with reciprocating motion of a piston 91 is cancelled by the balance weight 94. However, secondary vibration in the direction crossing to a cylinder shaft is generated along with the revolution of the balance weight 94. Consequently, revolution of the crank shaft 92 is transmitted to the balancer shaft 82 via the balancer drive gear 83 and the balancer driven gear 81, and the balance weight 84 of the balancer device 80 is revolved with the same phase as the balance weight 94 of the crank shaft 92 in the opposite direction, thereby secondary vibration accompanied with revolution of the balance weight 94 is cancelled to reduce the vibration of the engine 90.

Since the above balancer device 80 has a constitution driven by the revolution of the engine 90, when the torque transmitted to the balancer driven gear 81 from the balancer drive gear 83 fluctuates along with the fluctuation in the number of revolutions of the engine as a result of changes in the driving situation, vibrations and impacts act on the tooth portion of the balancer driven gear 81 from the balancer drive gear 83.

However, in the balancer driven gear 81 (1) according to the present invention, the vibrations or the impacts placed to the plastic portion (4, 5) at the peripheral side are dispersed over the whole circumference of the balancer driven gear 81 through the inner core 4 with the high elastic modulus, and relative revolution between the inner core 4 and the metal insert 2 is allowed. Therefore, elastic deformation occurs at both lateral layer portions of the surface layer member 5 with the low elastic modulus, the vibrations are attenuated and the impacts are absorbed by the viscoelastic behavior, and the tooth beating sound by backlash is suppressed, thereby allowing a quiet and low vibration operation of the engine 90.

In addition, the burden on the tooth portion engaged with the balancer driven gear 81 and local deformation are alleviated, thereby improving the impact resistance or/and fatigue strength of the balancer driven gear 81. As a result of the surface layer member 5 made of plastic, it is possible to achieve abrasion resistance and low aggression to the balancer drive gear 83.

While some embodiments of the present invention have been described above, the present invention is not restricted by the above described embodiments, and various kinds of modifications and changes based on the technical idea of the present invention are possible.

For instance, in the above described embodiment, as the engaging portion, shown is the case where the locking groove 24 is provided to the metal insert 2, and the locking projection 54 is provided on the surface layer member 5 However, the relation between the groove (concave) and the projection may be reversed. In addition, some other shape capable of avoiding mutual revolution may be allowed.

In addition, also the present invention can be implemented such that a metal insert (2) is provided with a large diameter portion at both sides in a direction of gear revolving axis, and by possessing "small diameter portion" at its center, both lateral layer portions of a surface layer member (5) are joined to the large diameter portion, an engaging portion is provided at a joined portion thereof, and the plastic gear is formed in such a way that an inner core (4) is fitted in a circumferential groove of the metal insert (2).

Further, in the above described embodiment, described is the case where the present invention is implemented as the spur gear. However, the present invention is not restricted by this. Within the scope of the present invention, it is possible to implement as the gear some other embodiment such as a helical gear, or a bevel gear. In addition, instead of forming the shaft hole 20 in the metal insert 2, some other revolving body such as a revolving axis, or a hub may be formed integrally to the metal insert 2. Further, at inner circumferential side of the metal insert 2, plastic part may be further provided.

Many modifications and other embodiments of the inventions set forth herein will come to mind to one skilled in the art to which these inventions pertain having the benefit of the teachings presented in the foregoing description. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A plastic gear comprising:
   a gear peripheral portion made of plastic, including gear teeth; and
   an inner circumferential member with an annular shape or a disk shape, positioned at an inner circumferential side of the gear peripheral portion,
   wherein the gear peripheral portion includes an inner core having inner tooth portions corresponding to respective gear teeth, and a surface layer member covering the inner core and having obverse tooth portions which cover respective inner tooth portions, wherein the inner core and the surface layer member are made of plastic, the plastic of the inner core having a higher elastic modulus and strength than the plastic of the surface layer member, in which the inner core is fitted and slidably engaged around a periphery portion of the inner circumferential member so that the periphery portion extends over the entire periphery of the inner circumferential member with an even cross sectional shape so as to allow relative displacement of the inner core in the circumferential direction thereof, and an engaging portion is provided at an interface between a lateral layer portion of the surface layer member and the inner circumferential member so as to prevent relative displacement in the circumferential direction thereof.

2. The plastic gear according to claim 1, wherein a fitted portion defined by the interface between the inner core and the periphery portion of the inner circumferential member is comprised of at least one pair of a circumferential groove and a circumferential ridge, both extending in a circumferential direction of the inner core and the gear inner circumferential member.

3. The plastic gear according to claim 2, wherein the gear inner circumferential member is made of metals or ceramic materials, the inner core is formed by an insert injection molding with the gear inner circumferential member as an insert material around the gear inner circumferential member, and the surface layer member is formed by insert injection molding with the gear inner circumferential member and the inner core as insert materials around the gear inner circumferential member and the inner core.

4. The plastic gear according to claim 1, wherein the gear inner circumferential member is made of metals or ceramic materials, the inner core is formed by an insert injection molding with the gear inner circumferential member as an insert material around the gear inner circumferential member, and the surface layer member is formed by insert injection molding with the gear inner circumferential member and the inner core as insert materials around the gear inner circumferential member and the inner core.

5. The plastic gear according to claim 1, wherein the periphery portion of the inner circumferential member is provided as a large diameter portion located intermediately in an axial direction thereof and small diameter portions at both sides of the large diameter portion, the inner core is fitted around the large diameter portion, respective lateral layer portions of the surface layer member overlap respective lateral faces of the large diameter portion and each inner periphery edge portion of the lateral layer portions is adjacent to each small diameter portion; the engaging portion is provided at each of the interfaces thereof.

6. The plastic gear according to claim 5, wherein the gear inner circumferential member is made of metals or ceramic materials, the inner core is formed by an insert injection molding with the gear inner circumferential member as an insert material around the gear inner circumferential member, and the surface layer member is formed by insert injection molding with the gear inner circumferential member and the inner core as insert materials around the gear inner circumferential member and the inner core.

7. The plastic gear according to claim 5, wherein circumferential concavities are formed in respective lateral faces of the large diameter portion extending in the circumferential direction along the small diameter portion, and the interfaces of respective lateral layer portions and small diameter portions are widened inwardly to the thickness of the large diameter portion.

8. The plastic gear according to claim 7, wherein the gear inner circumferential member is made of metals or ceramic materials, the inner core is formed by an insert injection molding with the gear inner circumferential member as an insert material around the gear inner circumferential member, and the surface layer member is formed by insert injection molding with the gear inner circumferential member and the inner core as insert materials around the gear inner circumferential member and the inner core.

* * * * *